(12) United States Patent
Price

(10) Patent No.: US 7,904,608 B2
(45) Date of Patent: Mar. 8, 2011

(54) SYSTEM AND METHOD FOR UPDATING SOFTWARE IN ELECTRONIC DEVICES

(76) Inventor: Robert M. Price, Seattle, WA (US)

( * ) Notice: Subject to any disclaimer, the term of this patent is extended or adjusted under 35 U.S.C. 154(b) by 0 days.

(21) Appl. No.: 11/124,366

(22) Filed: May 4, 2005

(65) Prior Publication Data

US 2006/0026304 A1 Feb. 2, 2006

Related U.S. Application Data

(60) Provisional application No. 60/567,903, filed on May 4, 2004.

(51) Int. Cl.
*G06F 3/00* (2006.01)
(52) U.S. Cl. ............ 710/11; 710/3; 710/4; 710/5; 710/8; 710/10; 710/15; 710/16; 710/20
(58) Field of Classification Search .................. 710/3, 4, 710/5, 8, 10, 11, 15, 16, 20
See application file for complete search history.

(56) References Cited

U.S. PATENT DOCUMENTS

| | | | |
|---|---|---|---|
| 6,023,268 A * | 2/2000 | Britt et al. ............ | 709/203 |
| 6,074,434 A | 6/2000 | Cole et al. | |
| 6,202,207 B1 * | 3/2001 | Donohue ............ | 717/173 |
| 6,269,456 B1 * | 7/2001 | Hodges et al. ........ | 714/38 |
| 6,457,076 B1 | 9/2002 | Cheng et al. | |
| 6,549,770 B1 | 4/2003 | Marran | |
| 6,678,741 B1 | 1/2004 | Northcutt et al. | |
| 6,735,434 B2 | 5/2004 | Criss et al. | |
| 2001/0033243 A1 * | 10/2001 | Harris et al. ........ | 341/176 |
| 2002/0042886 A1 | 4/2002 | Lahti et al. | |
| 2003/0143991 A1 | 7/2003 | Minear et al. | |
| 2003/0195949 A1 * | 10/2003 | Slivka et al. ........ | 709/219 |
| 2003/0217357 A1 | 11/2003 | Parry | |
| 2005/0044164 A1 | 2/2005 | O'Farrell et al. | |

* cited by examiner

*Primary Examiner* — Tariq Hafiz
*Assistant Examiner* — Jasjit S Vidwan
(74) *Attorney, Agent, or Firm* — Black Lowe & Graham PLLC

(57) ABSTRACT

Particular embodiments include a system and method to enable a user-controlled proxy system or coordinating computer to automatically or semi-automatically communicate with multiple devices, determine the currently operating software contents and versions for each device, and to automatically or semi-automatically upgrade each device with updated software without requiring user intervention. The software may include communication, operating system or application-specific program codes that improve a given device's designed function.

23 Claims, 11 Drawing Sheets

SYSTEM AND METHOD FOR UPDATING SOFTWARE IN ELECTRONIC DEVICES

PRIORITY CLAIM

This application claims priority to U.S. Provisional Application Ser. No. 60/567,903 filed May 4, 2004, incorporated by reference in its entirety herein.

COPYRIGHT NOTICE

This disclosure is protected under United States and International Copyright Laws. © 2005 Robert M. Price. All Rights Reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to collecting data from, sending data to, and/or updating software or digital data in electronic devices.

BACKGROUND OF THE INVENTION

Digital-based devices require software in order to interact with other devices, store, and manipulate information and to perform its designed task. If the software is deficient or otherwise corrupted, generally so is the ability of the device to reliably operate. Digital-based devices often require updated software versions in order to fix poorly performing software that originally was supplied with the device, commonly referred to as software patches. Other software patches are obtained in order to prevent introduction of, repair, counter intervene, or otherwise eliminate malevolent code hacked in by vandal software authors. Other software updating includes version replacement to optimize performance and/or broaden utility over what a customer had been satisfactorily using, or introduction of additional software modules to a device. Furthermore, addition of new data other than executable software onto a device may be useful, for example to add new map data to a personal digital assistant or new music to a portable music-playing device.

Digital devices vary in their complexity. Comparatively simple devices require only a few hundred lines of machine code in an EEPROM (electrically erasable programmable read-only memory) as commonly found in a microwave oven or coffee maker with a simple keypad or a timer, and as such can support little modification to their software. Moderately complex devices contain a substantial amount of software, but have no provision for making software updates simple or notifying the customer when they might be necessary. Complex digital devices require microprocessors that sport only the simplest software, yet require firmware, an operating system, or other device-specific software. Examples of such devices include DSL modems, cable modems, network routers, wireless access points, digital cameras, MP3 or other music and video players, memory card readers, combination printer/scanner/copier devices, personal digital assistants, certain cellular phones, portable game-playing systems, GPS receivers, other computers including special-purpose computers such as dedicated word processing or calculation or entertainment computers, and combination devices which incorporate a plurality of one or more of these functions. Additional examples of such devices which are not currently widely available include common home and kitchen appliances with added software capability and even running shoes with a microprocessor recently introduced to consumers. These moderately complex digital devices require interactions of the device user or purchaser to determine if software updates are available, obtain (request and download) software updates for the device, and/or to perform authentication or authorization to updated the device.

These devices often require multiple sessions by a user to search, retrieve, and transfer the current software updates for a device on a device-by-device basis. Such manual search and retrieve process presents a laborious and inconvenient burden to the device end-user or owner. In the current state of the art such software updates are therefore infrequently performed, frequently resulting in replacement of faulty products, customer return of non-functional products, or telephone-based support calls to troubleshoot problems which are time-consuming and expensive to both user-purchasers and manufacturers. Furthermore, because the process of obtaining device software and installing it is limited, the market for third-party software add-ons or improvements for such devices is very limited in scope.

SUMMARY OF THE INVENTION

Particular embodiments include a system and method to enable a user-controlled proxy system or coordinating computer to automatically or semi-automatically communicate with multiple devices, determine the currently operating software contents and versions for each device, and automatically or semi-automatically upgrade each device with updated software without requiring user intervention. The software may include communication, operating system or application-specific program codes that improve a given device's designed function.

The coordinating computer is able to search for updating software upon connection with a given device, or alternatively, receive and store updated software presented by an originating software entity, and automatically deliver the software to a given device upon the device's re-connection to the proxy system.

The devices may be homogenously similar, or substantially diverse and heterogeneous. The homogenous or heterogeneous digital devices may be in continuous or intermittent signal communication with the proxy-coordinating computer by wired or wireless connections. The proxy computer is similarly accessible by wired and wireless connection, and acts as an intermediate node for the software updating of devices that may not necessarily have the capability to update themselves.

Alternate embodiments of the system maintain the elements of one or more devices and a coordinating computer and employ these elements for other purposes related to management of devices. The system as described above is preferably optimized for updating software. The pursuit of such other purposes may include collection of other types of device data.

These and similar data assist in enabling one or more or any combination of the following and other actions: software updates, timely product support, warranty administration, inventory or insurance or depreciation of devices, market research, sales and promotion of device upgrades or replacements or of additional devices or device software or services or device accessories, design research for improvement of reliability or functionality or compatibility or ease of use of current and future devices, and competitive analysis.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
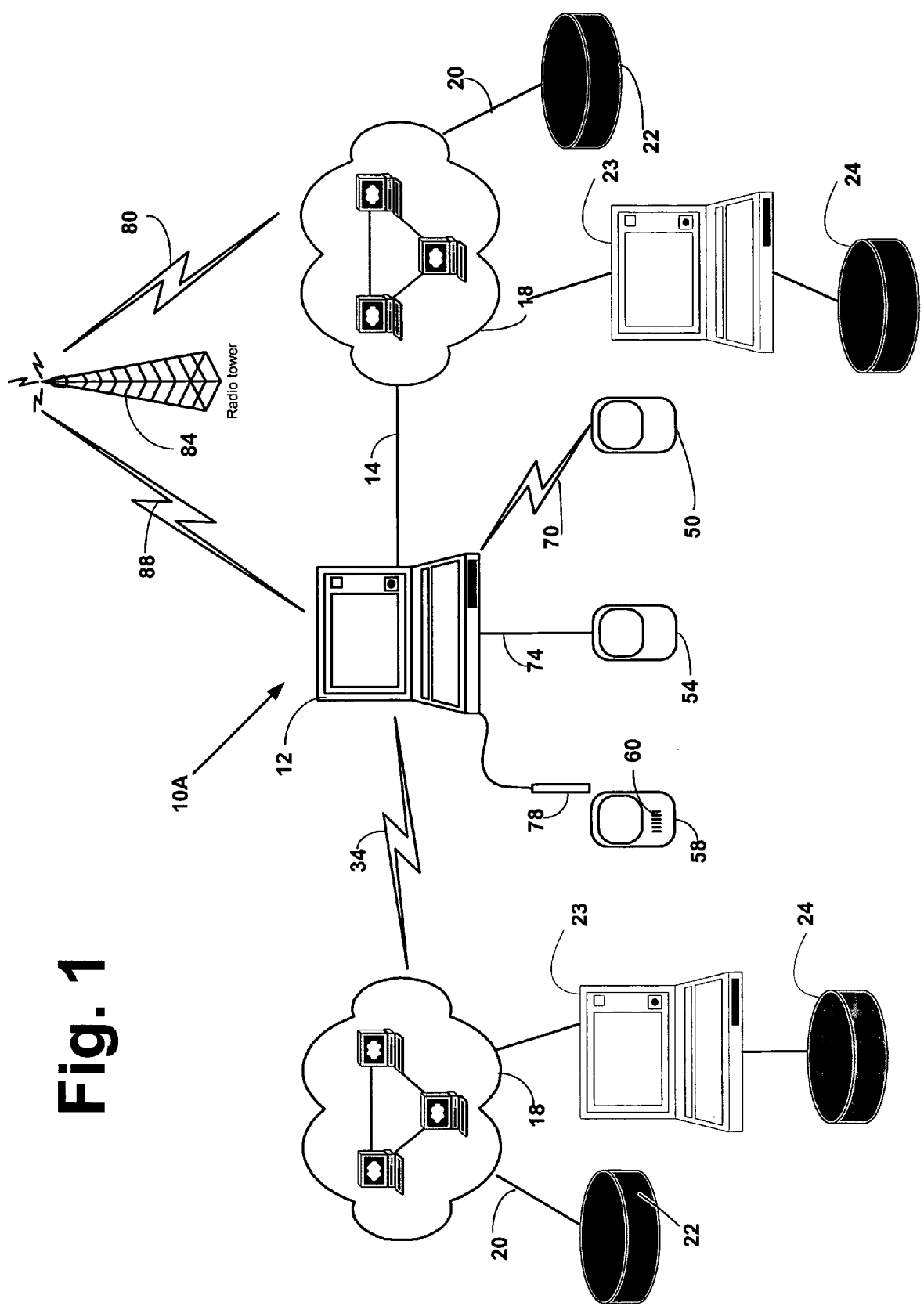
FIG. 1 is a schematic of a particular embodiment of the software updating system.

To facilitate the system, the user will designate one device with user interface and communications capabilities (typically a PC, but a TiVo-like device, Palm, or Pocket PC could work as well, for example). This device serves as a central point of communications as a "coordinating PC," and hereafter referred to as the proxy system. This device acts as a proxy in the common lay sense of acting on behalf of one or more other devices, and may include but does not require operation as a proxy server in the particular sense commonly used in discussions of Internet browsing and connectivity. In alternate embodiments, the "device" can be a virtual device, such as a specified domain on the Internet, enabling the user to access the system from any device that can access the Internet.

One preferable step in the process comprises identifying to the coordinating PC the set of one or more devices to be kept up-to-date. This can be done by manually entering device identification including current software revision levels, or (better) by connecting the device to the coordinating PC via USB/1394/serial/other communications port, Wi-Fi, infrared, Bluetooth, or other wireless means (FM, etc.), or even optically (for example, by scanning a bar code on the device or its packaging). In one embodiment, the system has the ability to offer the user the option (when a device is connected) to omit this device from the collection of devices to be kept up-to-date. For example a device that is already subject to update service is provided by another coordinating PC. A further optional embodiment is for the coordinating PC to store an identifying code on the device so that if the device having the identifying code is connected to other coordinating PC's, these computers may default to not updating the device already having the identifying code.

Another step, preferably performed at this point or later (although in alternate embodiments it could be performed earlier) would be to establish a communications channel between the device and the coordinating PC which would be used for updates. In addition to a communications means, security could be established, for example by storing on the PC an administrative password for the device (as nearly every wireless access point, network router, or broadband modem has), and/or setting the password on the device to a known or determinable value. In some environments, security may be particularly important in the case where the communication was wireless. In one embodiment, the system multiple forms of connection, for example establishes a physical connection the first time to initiate security, and then uses wireless media for subsequent connections. In other embodiments, the security can be active or dynamic, updating periodically or at random intervals, depending on user preferences or other variables.

In a preferred mode of operation, the list of devices and their software revision levels are compared with a list installed on or accessible to the coordinating PC or on a central service (e.g., an Internet site maintained for the purpose). Based on the comparison it the system has the capability of determining that there are optional updates, critical updates, or additional software components available for one or more of the devices. Optionally, in addition to performing a comparison (which places no private data outside the home or office other private space of the user), the system optionally stores a copy of the user's data, so that if they change coordinating PC's (for example) no information is lost.

While the system is capable of updating any electronic devices, in a preferred mode of operation the devices to be updated include preferably those having field-replaceable software content and a means of connection to the proxy update system. The software content may be of the embedded type such as a BIOS (basic input-output system) or firmware typically stored in an EEPROM, application software such as games or small applications with user interface, or indeed all or part of any stream of digital information such as ring-tones for cell phones or street maps or digital images. The means of storage for this software content may be EEPROM or flash memory, memory cards such as SD, XD, CF, or Sony memory stick, volatile memory, hard disk, CD or magnetic disk, or other media capable of saving and/or retrieving digital information. Preferably, the system has the capability of providing a connection from the device to the proxy update system in one or more of multiple different optional ways. For example, the connection may be intermittent or continuous, and/or may be wired or wireless, and/or may include serial or parallel port, USB or PC1394 ("firewire") connection, connection via AC power wiring such as that found in X-10 devices, Ethernet, Bluetooth or 802.11 wireless, infrared, or any other means, or any combination or sub-combination of the foregoing. The means by which the software content can be updated may vary widely and are discussed below. Examples of such devices include, potentially, cell phones, digital cameras, MP3 and video media players, all-in-one or combo printer devices, network routers and wireless access points, media readers such as those for compact flash or chip memory, PDAs, and indeed even home appliances such as microwaves with "smart" features, i.e. a processing chip and on-board software.

Another, and preferably the next, step in the process is an optional notification about the updates. The user can optionally select to be notified that updates are available via email, instant message or on-screen pop-up, or other means. In some embodiments, the user can view a list of devices and their status at their own initiation, at any time. Determination that updates are available can be via "pull" where the coordinating PC checks the service periodically, and/or via "push" where the service learns that a new update is available, and optionally notifies all candidate users with the appropriate device and (older) software versions.

An optional capability of the system is to bill or charge the user for the notification service or for updated or additional software for their devices. In this way, device manufacturers either could provide free support services to their customers or could actually sell extended service and support or software upgrades, or both. Examples include support for new media formats, interface improvements, technical improvements (digital sound processing for audio enhancement, for example), additional data (maps, phone numbers, songs), new software modules, more games on one's iPod, or improved security (e.g., upgrading a Wi-Fi access point from WEP to WPA security). In alternate embodiments, such improvements for devices are offered by one or more third parties other than or in addition to the devices' original manufacturer.

Assuming the user wishes to perform any available updates, another, and preferably next step is to transfer the new software to the coordinating computer. The network service in some embodiments actually stores the updated software, or (more likely) merely maintains an address for obtaining it, for example a link to a file on the website of the device manufacturer or other third party. The coordinating PC automatically or manually downloads the updated device software onto the PC's storage. The coordinating PC could also optionally download a PC application used to update the device.

Preferably next, (although alternative sequences are provided in other embodiments) the coordinating PC performs the update. It can optionally request that the user establish communications with the device to be updated ("please connect your Nikon CoolPix 950 camera to your serial port now") or wait and perform the update automatically, the next time the device is connected. It can use a specific application that had been installed or downloaded to perform the update, and/or it can use a standard protocol. These protocols can be specified simply, for example by choosing a specific TCP/IP port number and packet sequence for establishing authentication and initiating software upload.

Upon success or failure of the update, or at any other interval, the coordinating PC updates its record of the device status. In addition to maintaining the current list of software installed on each device, it can also maintain an update history and allow the user to easily "roll back" to an earlier version if the new version has undesirable characteristics (instability, incompatibility, changes in user operation, security flaws, etc.) The user might receive a notification that an update was performed, especially in the case where they did not manually initiate it, and such notification might include details about what was changed or new capabilities added to their device.

Note that in one embodiment of the system, the entire update process can be performed with little, or even no user intervention at all, or optionally only with a notification after-the-fact that an update was performed. For example, devices can be sold with a default "stay current" setting (that can be overridden by the users at their option) that instructs the device to automatically update itself periodically without user request or intervention.

With this system in place, an additional capability is available, namely the capability to use the communication system (from the device through the coordinating PC and preferably to the central service, and thence back to the manufacturer or its agent) to perform additional troubleshooting. Even after devices have been sold and are in use by customers, manufacturers can still interact with devices, obtain diagnostic information ("dumps" following crashes, up-time statistics, configuration data, and so on), and generally use the communication channel to measure reliability, gather information used for making further software improvements, measure the popularity of device features or monitor usage profiles (for example, to determine how much storage future models of audio players or cameras should include or what inventory to produce based on measurements from current customers).

A preferred embodiment 10A of the software updating system is shown in FIG. 1. In the system 10A, a coordinating computer 12 is in communication 14 with a network 18 in communication 20 with a network data store 22. Alternatively, the computer 12 is in direct wireless communication 34 with the network 18 and data store 22. The coordinating computer 12 is shown in communication with three electronic devices having software for updating. At least one electronic device is preferred for communication with the computer 12, and communication is not limited to three devices as shown. Any number of devices can communicate with coordinating computer 12. A first electronic device 50 is in wireless communication 70 with the computer 12. A second electronic device is in line or wired communication 74 with the computer 12. A third electronic device 58 includes a barcode 60 that is readable by a barcode reader 78 in communication with the computer 12. Alternatively, bar code reader 78 is an optical scanner that transmits the bar code image to the coordinating computer for processing and interpretation later or elsewhere. Alternatively, bar code 60 is replaced with an optical or wireless radio tag as the device identifier. Alternatively, the computer writes data on an intermediate form of storage such as a compact disc, portable hard drive, or memory card (such as USB memory drive, compact flash, SD, XD, Sony memory stick, or other type) for later insertion to or connection with the device. Alternatively, the computer communicates with the device by audible means such as touch tones or voice commands.

Preferably, software code for updating the software in the electronic devices is delivered from the data store 22, to the network 18, and then to the coordinating computer 12 via wired communication 14 or via direct wireless communication 34 from the network 18, or alternately bypassing the network, by delivery from the data store 22 to the computer 12 Alternatively, software code may be delivered to the computer by indirect wireless communication. The indirect wireless communication includes a wireless uplink channel 80 to a radio or cell tower 84, then a downlink channel 88 to the computer 12.

Updated software code received by the computer 12 from either the line communication 14, the direct wireless communication 34, or by the downlink channel 88 is processed by the computer 12 for delivery to the electronic devices. Such processing can optionally include any one or more, or any combination of the following: un-compression of data, verification of digital signatures, de-encryption of the data, security authorization, confirmation of payment, if any, etc. The processed and/or updated software code is amenable to the software-controlled devices in communication with the computer 12. The system preferably accommodates any number of devices, and no particular number is necessary or required. For explanatory purposes only, an example of three devices is described in this Figure. The first device 50 receives the processed and/or updated software code from the computer 12 via the wireless channel 70. Similarly, the second device 54 receives the processed and/or updated software code from the computer 12 via the communication line or channel 74. The third device 58 is identified by the scanning the barcode 60 affixed to or associated with the third device 58 by the barcode reader 78. The third device is 58, preferably once identified, receives the processed and/or updated software code from the computer 12 via the line channel 74 or the wireless channel 70 or using intermediate storage. Once the updated and processed software code is delivered to the first 50, second 54 and/or, third 58 devices, the software in these devices is updated with the new code.

Alternatively, coordinating computer 12 can coordinate the updating of software of one device based on relationships with other related devices or with software on the communicating computer itself or other computers attached via a network interface. For example, if the user purchases a new digital camera, and the system of the present invention updates the software on the camera three (3) months later, the system will realize (by scanning its inventory of software on related devices and/or accessing related databases) that the digital images generated by the camera (now that it has been updated) are no longer compatible, or not ideal, or possibly even optional, with the version of Photoshop® (for example), resident on the local PC. The coordinating PC 12 also then updates Photoshop® to resolve the incompatibility or sub-optimum compatibility. In another example involving devices and no conventional computer software, a user might add the capability to a sound-recording device to support a new sound-encoding format and wish to add capability to decode and play back this format to a sound-replay device.

Figure 2:
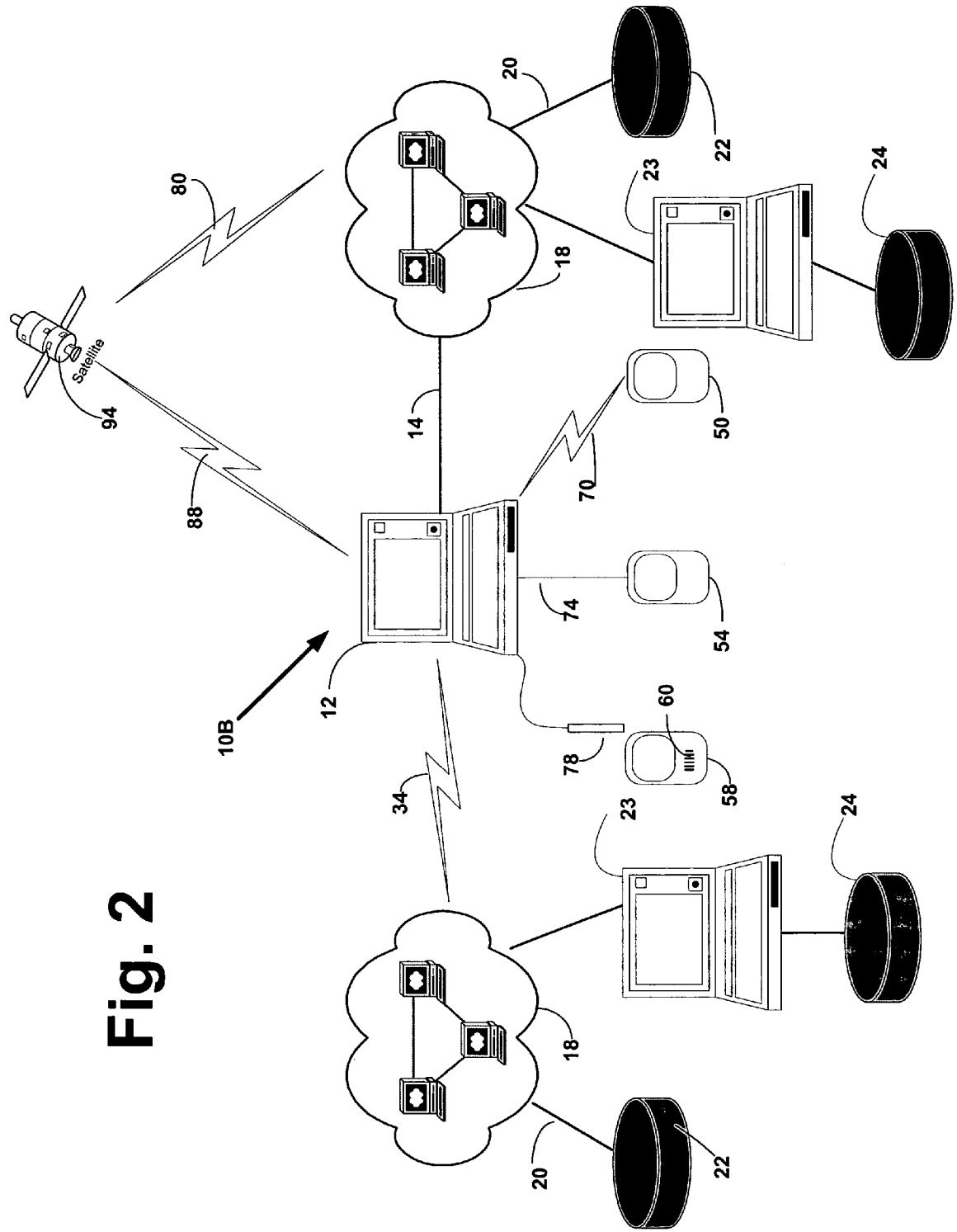
FIG. 2 is a schematic of an alternate embodiment of the software updating system.

A preferred embodiment 10B of the software updating system is shown in FIG. 2. In the system 10B, a coordinating computer 12 is in communication 14 with a network 18 in communication 20 with a data store 22. Alternatively, the computer 12 is in direct wireless communication 34 with the network 18 and data store 22. The computer 12 is shown in communication with (by way of example only) three electronic devices having software for updating, and computer 12 serves to act as a coordinating PC. At least one electronic device is preferred for communication with the computer 12, and is not limited to three devices. A first electronic device 50 is in wireless channel communication 70 with the computer 12. A second electronic device is in line channel communication 74 with the computer 12. A third electronic device 58 includes a barcode 60 that is readable by a barcode reader 78 in communication with the computer 12. Software codes for updating the software in the electronic devices is delivered from the server 22, to the network 18, and then to the computer 12 by line communication 14 or via direct wireless communication 34 from the network 18. Alternatively, software codes may be delivered to the computer by indirect wireless communication. The indirect wireless communication includes a wireless uplink channel 80 to a satellite 94, then a downlink channel 88 to the computer 12.

Updated software code received by the computer 12 from either the line communication 14, the direct wireless communication 34, or by the downlink channel 88 preferably can be processed by the computer 12 for delivery to the electronic devices. Such processing can include any kind of data processing, including by way of example any one or more of the following kinds of processing, alone or in any kind of combination: uncompression of data, verification of digital signatures, de-encryption of the data, or any other kinds of processing, including, without limitation, any processing described elsewhere in this application. The processed and/or updated software code is amenable to, or is executable by, the software-controlled devices in communication with the computer 12. The first device 50 receives the processed and/or updated software code from the computer 12 via the wireless channel 70. Similarly, the second device 54 receives the processed and/or updated software code from the computer 12 via the line channel 74. The third device 58 is identified by scanning the barcode 60 affixed to or associated with the third device 58 by the barcode reader 78. The third device 58, preferably once identified, receives the processed and/or updated software code from the computer 12 via the line channel 74 or the wireless channel 70. Once the updated and/or processed software code is delivered to the first 50, second 54 and, third 58 devices, the software in these devices is updated with the new code.

The coordinating computer 12 which serves as the nucleus of a proxy update system preferably has a direct or indirect means of connection to or communication with the device to be updated, optionally as described above, and typically has a means of connection to or communications with one or more sources of software updates. In a typical case, this system preferably includes a processor, storage mediums, and has a user interface capability. Connection to or communication with sources of update software from primary and secondary entities is preferably via the Internet or intranet and use of hypertext transfer protocol (HTTP) and/or file transfer protocol (FTP). The coordinating computer 12 is capable of accepting requests for specific information items or streams and providing those items or streams on demand, for example, an Internet server responding to FTP and/or HTTP requests. This system may often be, but need not always be, provided by the manufacturer (primary software entity) of the device to be updated. Alternatively, secondary software entities, such as website addresses having device software databases, can similarly be accessed by the coordinating computer 12.

Figure 3:
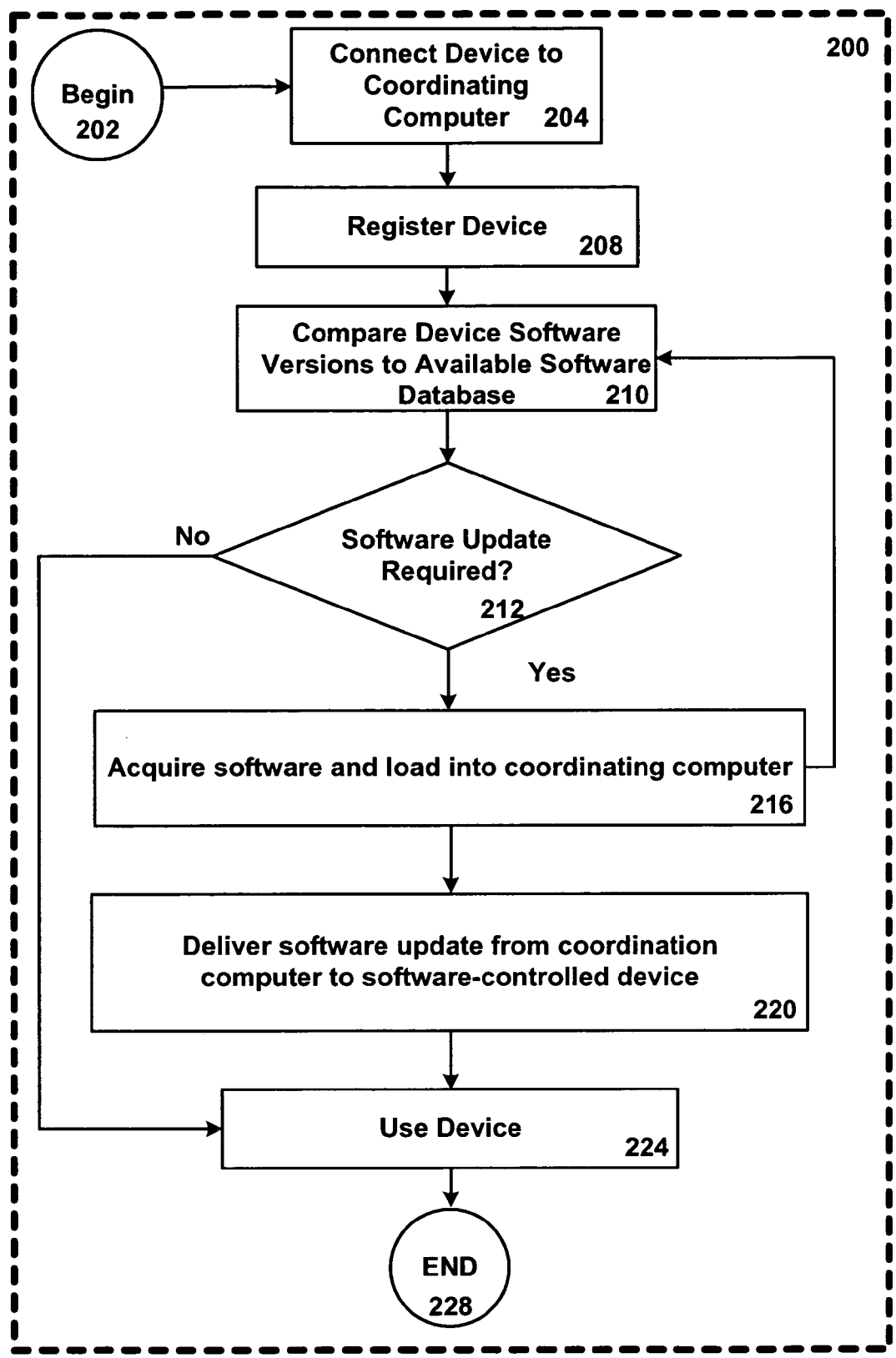
FIG. 3 is a schematic of a particular embodiment of a method for updating software in devices.

FIG. 3 is a schematic of a preferred embodiment of a method 200 for updating software in devices attached to or in communication with a coordinating PC or computer 12. A method 200 establishes a coordinating computer 12 to function as an agent that runs or provides continuous or non-continuous surveillance of primary and secondary software entities or services for software code upgrades for devices, including, without limitation those devices that can be or are attached to or associated with the coordinating computer 12. The method 200 begins at entry point 202 where the coordinating computer 12 is active, the software-controlled device (50, 54, and/or 58, or others) are or can be connected to or in communication with the coordination computer 12 at block 204. The device is activated, operated with initially loaded software, and automatically registered at block 208. Thereafter, at block 212, a decision is made, optionally independent of the user, to determine whether any device software requires or could benefit from updating. If negative for requiring or benefiting from updating, the device with the initially loaded software may be used as-is by the user at block 224. If affirmative for requiring or benefiting from updating, the software update can be, or preferably automatically is, acquired and loaded into the coordination computer 12 at block 216. In one embodiment the software updates are acquired from the network server independent from user direction. Software updates acquired at block 216 are stored in the Software Version Database 210 to expand or build the database. Thereafter, at block 220, the software update is delivered from the computer 12 to the software-controlled devices (50, 54, and/or 58 etc.) for updating. Thereafter, at block 224, the user may use the device with the updated software. In this embodiment, terminus 228 ends the updating method 200. The method of FIG. 3 imparts to a single device and/or multiple devices, preferably which remain running at all times, the optional ability to check on a periodic or other interval for the availability of updates, and/or to receive notifications that updates have been made available, and then perform these updates or to prompt the user to engage the device to perform an update, or any combination of the foregoing. Method 200 can be performed in alternate sequences, or with any one or more of the foregoing steps omitted. The software employed in the method 200 on the proxy update system or coordinating computer 12 of the systems 10A and 10B preferably includes several sub-programs and performs several tasks, as described below. In a preferred embodiment, the software is configured to start when the overall system starts and remain running at all times, except for replacement and routine maintenance.

Residing in a preferred method 200 is a software agent whose tasks are to populate a list of one or more devices for which the coordinating computer 12 acts as a proxy in searching for updates and/or performing update processes. For one or more of, or preferably each device, the software agent gathers, stores and/or has access to at least sufficiently unique identification about the type of the device to determine what software it is capable of utilizing. In one embodiment, the identification data consists of a short unique identifier such as a GUID, or globally unique identifier, a standard format for generating an ID-tag that is not reused, or a combination of manufacturer, device model, and revision number information, or both. Additionally, the software agent can, and preferably does, store data about one or more of, or any combination of the following: the current software contents of the device including loaded software application(s) and versions thereof, type of connection between the device and the proxy system, date and time of last connection, and user preferences such as whether the device is to be updated automatically with a minimum of confirmations.

Referring again to FIG. 3, the list of devices generated by the method 200 is populated in one embodiment by manual entry of an end-user, and in another by more automatic discovery or a combination of automatic and manual discovery. Such discovery is done at any combination of times including initial, i.e. when the agent is first installed and configured, periodic (e.g. nightly), or in response to certain events like installation of a new device. In a preferred embodiment it is be performed by scanning the software of the proxy system, for example in the case of a Windows PC, by examining the Windows Registry for recorded information about devices that have connected to the PC or are currently connected. In this preferred embodiment it is additionally performed by enumerating devices on certain connection interfaces to the coordinating computer, such as a universal serial bus (USB) or many other types of ports or busses, or use of the Universal Plug and Play (UPnP) protocol. The discovery portion of the agent also scans the system for telltale installed software applications that indicate use of certain devices, and also registers with the system to receive notification of certain events such as installation of a new device or connection of a device. Other means are also provided for, such as optical scanning of the UPC bar code on device packaging, and detecting the events wherein users purchase devices via the Internet or register their purchases with manufacturers. In one embodiment the agent looks up and interprets instructions specific to the type of device in order to determine how to query it for current firmware version or other software contents. Such means of querying include enumerating file contents of specific directories or areas of the device storage, opening a specific address or port and sending a query instruction, retrieving a response from a URL the device supports, or other means.

The agent residing in the method 200 may alternatively launch an associated sub-program which contains device-specific capability for determining software contents, or display instructions to an end-user via the proxy update system user interface and ask the user to interact with the device or examine its labeling, and provide software or version information to the agent. Additional information about the device may also be gathered automatically or via a user interface, such as serial number, user's nickname for the device, utilization statistics maintained by the device or user preferences set for the device, details of contents of the device storage, date of purchase or of first connection, point of purchase of the device, user name, address, and personal information, or reports of errors or diagnostic information maintained by the device. The coordinating computer 12 also is configured to communicate the above information back to the manufacturer or other central source for collation and/or other analysis. In a preferred embodiment the coordinating computer is capable of learning of, obtaining, and using newer means of querying the device to determine its type and software contents at any time at or after initial use of the system.

Figure 4:
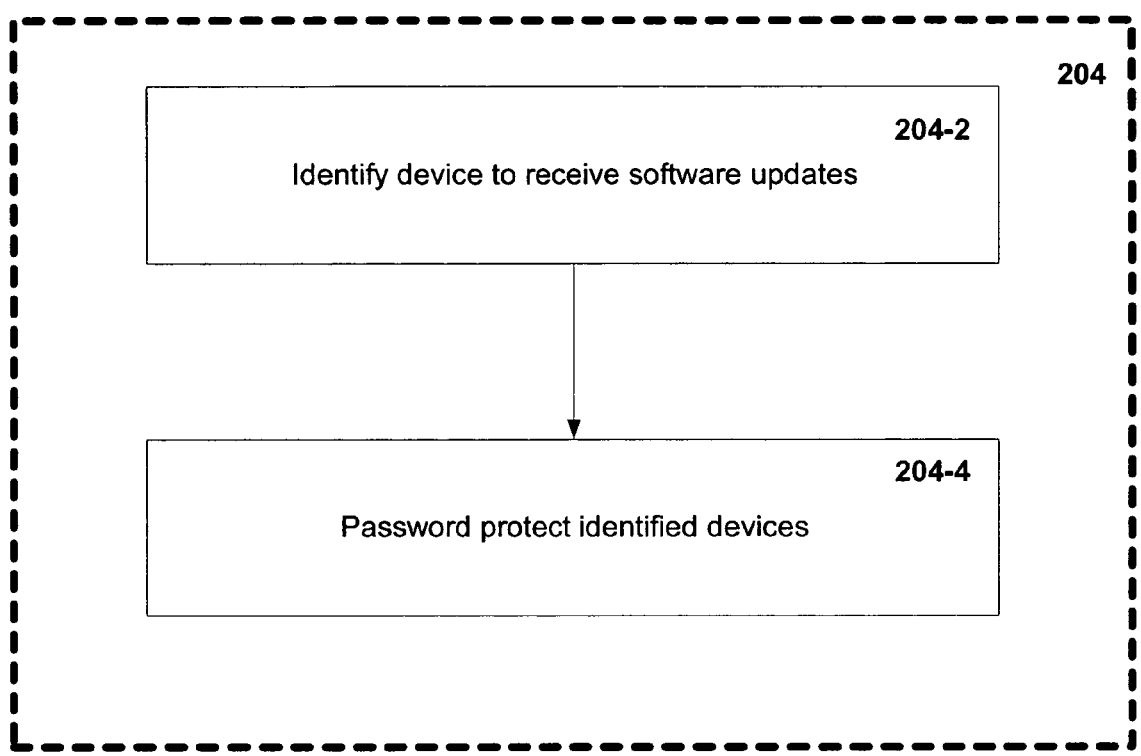
FIG. 4 is an expansion of the Connect process block of FIG. 3.

FIG. 4 is an expansion of the Connect process block of FIG. 3. The Connect process block 204 includes an Identify device to receive software updates block 204-2. In block 204-2, multiple devices similarly related or diversely heterogeneous or dissimilar are identified by the coordinating computer 12. In one embodiment these devices are categorized into device families or groups. For example, a printer group, a camera group, a scanner group, and PDA group. Within a device group, the devices are further sub-categorized by device manufacturer and model. Additionally, software modules detected on the device are determined, and categorized according to associated device and/or software vendor and/or type of software application. In one embodiment, once identified, at block 204-4, the devices are password protected.

Figure 5:
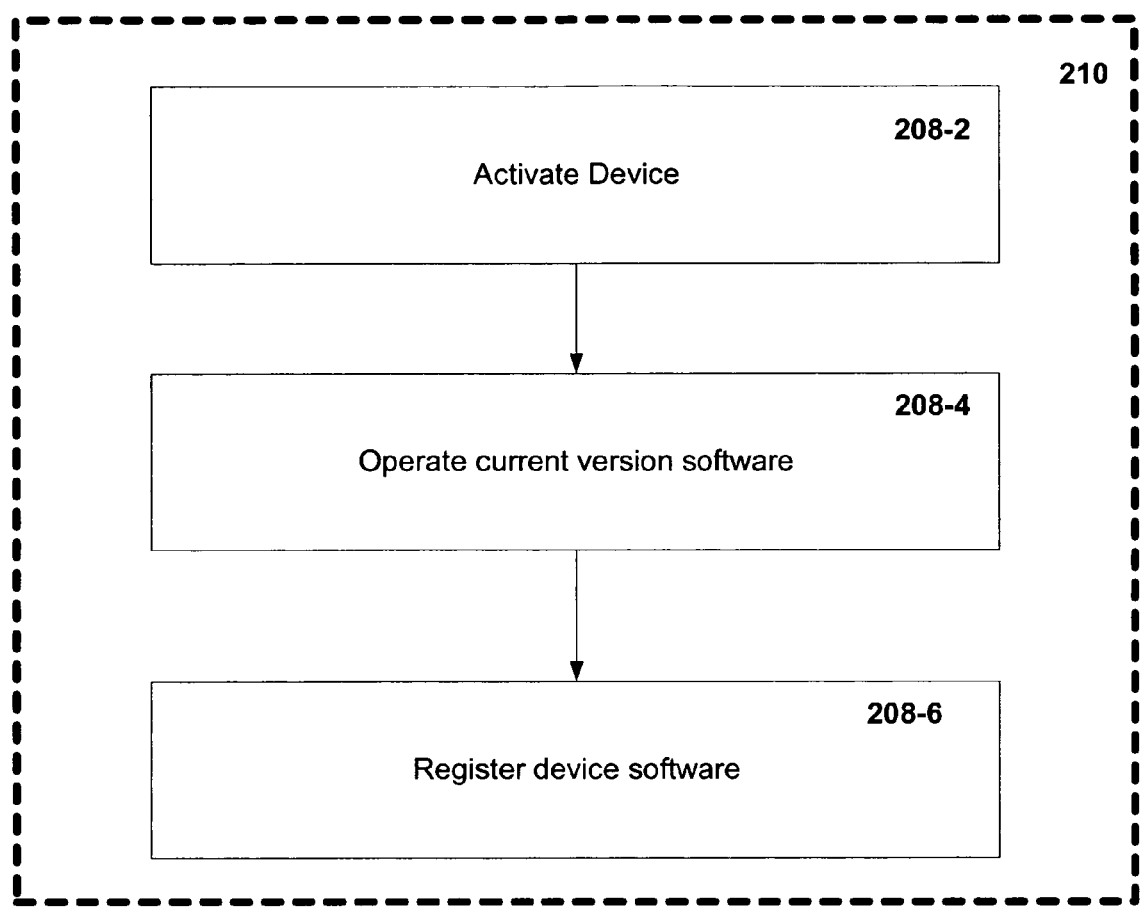
FIG. 5 is an expansion of the Register process block of FIG. 3.

FIG. 5 is an expansion of the Register process block of FIG. 3. In the Register Device block 208, the device is first activated at block 208-2 wherein this activation is detected by the coordinating computer 12. At block 208-4, the current version of the device's enabling software and other software is operated and recognized by the coordinating computer 12 and registered at block 208-6.

Figure 6:
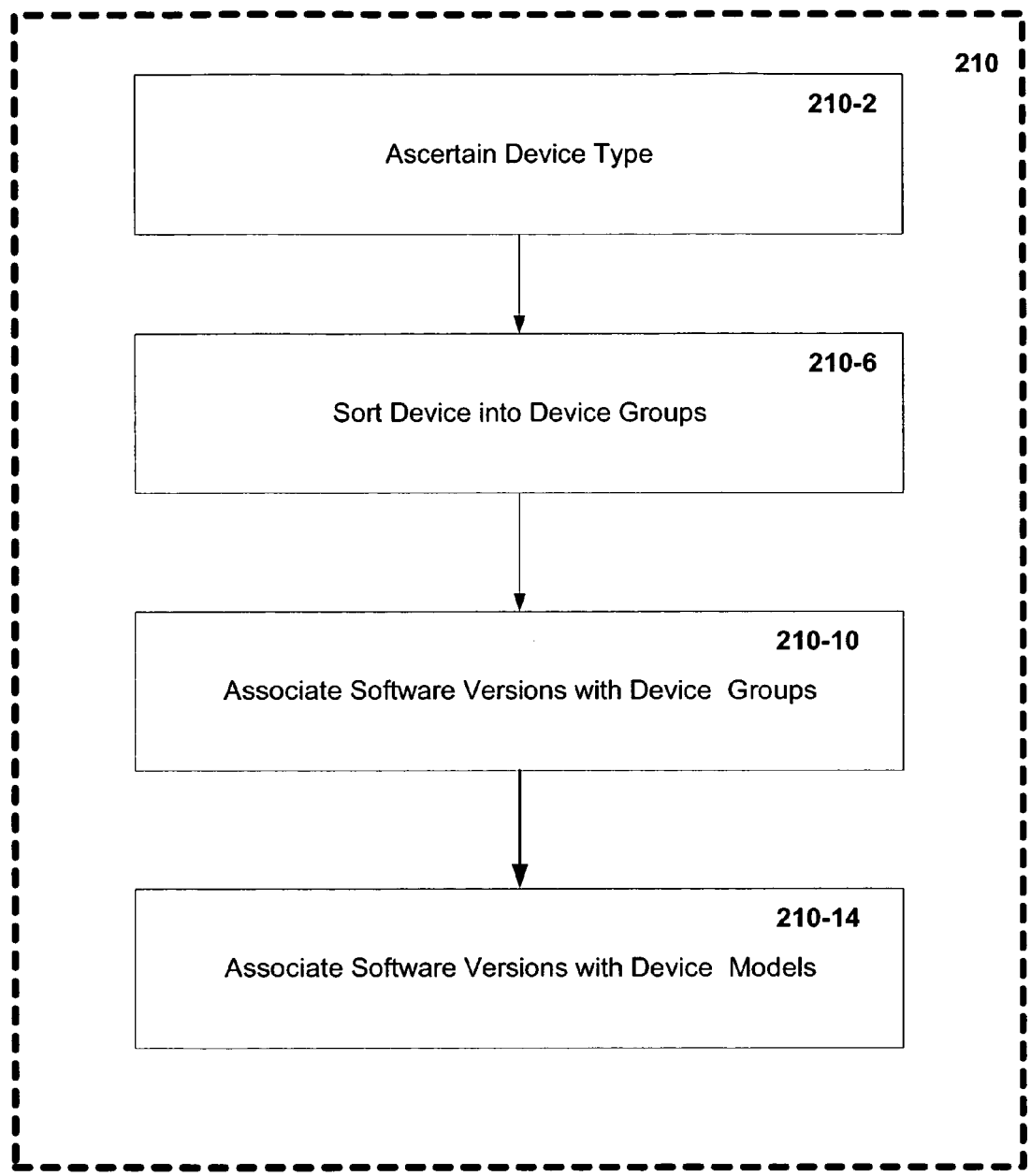
FIG. 6 is an expansion of the Compare Software Version block of FIG. 3.

FIG. 6 is an expansion of the Compare Software Version block of FIG. 3 and illustrates the software agent functioning in the method 200. The Compare Version block 210 includes the Ascertain Device Type block 210-2 which includes Identify device block 410-2 where the attached device is identified to receive software updates. Once the device is identified, a Password Protect block 410-4 is engaged to apply a password protection regimen to the identified devices. The software agent function may look up and interpret instructions specific to the type of device in order to determine how to query it for current firmware version or other software contents, for example, by enumerating file contents of specific directories or areas of the device storage, opening a specific address or port and sending a query instruction, retrieving a response from a URL the device supports, or other means. The agent may alternatively launch an associated sub-program which contains device-specific capability for determining software contents, or display instructions to an end-user via the proxy update system user interface and ask the user to interact with the device or examine its labeling, and provide software or version information to the agent.

Referring again to FIG. 6, acquired software versions are fed back to the Compare Software block 210 to further build or expand the device software database. The block 216 in synchronization with the block 210 maintains an array, database, table or list of available device software. In one embodiment this is a database which further includes version numbers of available firmware, software, or other digital data for a variety of devices and a source for obtaining each piece of device software, such as an Internet URL (FTP or HTTP address) to the manufacturer's website. In a preferred embodiment, additional information is stored about each piece of device software, such as its criticality, cost, dependency on other software updates, and textual description. This database is itself preferably updateable, for example via Internet download, and it is periodically updated by the software agent itself.

In another particular embodiment, a relational database is used to allow interrelated storage of lists of known device types, available software components associated with each device type, known versions of these components, specific instances of devices which are or have been attached to or in communication with the proxy update system 12, and to indicate from among the known software versions which actual software components and versions have been found on these attached or associated devices. In another embodiment two separate databases are maintained, one containing specific instances of devices attached to the proxy update system and another containing information concerning a broad set of available device software. Other embodiments distribute this data into a plurality of databases located on one or a plurality of systems, store said data in the Windows Registry or text files or in volatile or non-volatile memory, and combine the above data storage means.

A desirable addition to the Compare Software block 210 is to store for each device and/or each piece of device software the means by which software is updated on the device. This may be by means of a series of "escape" codes, transmission of a file to a known location or port or address on the device using HTTP, FTP, or other protocols, as part of an initialization sequence normally performed by software on the proxy update system, by means of end-user instructions such as depressing certain controls on the device, or by running a specific application on the proxy update system designed to perform the software update. The database may store a description of the means of updating to be displayed as instructions to the end user, or the location (local or Internet address) of a software application to run to perform the updates, or a series of instructions that the agent can interpret and execute itself. The database may also store authentication information, i.e. an update username and/or password that the device will require when updates are performed. The update systems 10A and 10B could include, for example, a single application which can send a file via FTP and use a small script to determine what port to send to, what escape sequence to send first, what file name to "put" to the device, and so on. This application could thereby perform updates on several dissimilar devices.

A third capability of the software agent associated with the Compare Software block 210 is to determine, for any given device, what updates are currently available. This is preferably done by comparing the software currently in the device with the software known to be available for the device as detailed in the Compare block 210. This comparison function preferably anticipates various cases and possibilities, for example the existence of an unknown device or a known type of device with newer software than that known to the database. In some embodiments employing a relational database, the Compare Software block 210 queries for any element in the data table of software found on devices to determine if there exists a corresponding entry in the data table of available software which indicates existence of a newer version of the same software element. Other embodiments further query to look for existence of an associated new software element or an update to an interdependent software element.

It is possible that there will be multiple updated software applications available for a given device. It is desirable that the method of encoding the database block 210 allows distinguishing between the case of two or more separate software components on the device to be updated, and two or more newer updates/versions of the same software component. In the latter case, information in the database may indicate that it is necessary only to perform the most recent update as it incorporates all desirable changes found in the intermediate versions. (Additionally, the database can indicate software dependencies, i.e. the requirement to perform one or more software updates before another specific update can be performed.)

A fourth optional capability of the software agent is to initiate the actual update process by means that may or may not require user interface. In some cases, it may involve display and acceptance of an end-user license agreement "EULA" for the software being updated. The agent may respond to connection of a device by initiating the update process, or may determine an update should be performed based on elapsed time or information about the criticality of software updates. In these cases, the agent can prompt a user to connect the device to allow updates to occur. The agent may log the date, time, and update action performed in a database which tracks update history. If an update occurs successfully, the software agent then updates the database block 210 to indicate that the device now contains the updated software, and may delete the locally cached copy of the software update described above if no other known devices require the same update.

Another optional capability of the software agent is its ability to process notifications of availability of new software and publicize them. The agent periodically scans known addresses or locations to check for the existence of new software or a new database of software availability. Additionally it optionally includes the capability to receive notification messages via datagram, email, instant messaging, or other means. These preferably contain sufficient information or pointers to specific information to allow the agent to update the entire database of block 210, or add or modify single entries in the database.

Other particular embodiments have the software agent providing an ancillary user interface presented to an end-user with additional capabilities and information concerning devices and the device update process. For example, the user may be permitted to view and modify the list of devices subject to update service and details about them, view a history of updates performed or updates available, and/or undo or "roll back" updates. Updates may also be forced to occur or not occur to override normal schedule parameters, and set preferences about which actions will be prompted or automatic, and/or how and when to perform authentication and/or payment, etc.

The method 200 employed in the systems 10A and 10B provide for a fallback option for determining current software versions that is more "manual" for situations in which such is required in order to be backward compatible with some older devices. For example, a display of text instructions can be provided to the user, and the user is prompted or otherwise queried to examine the device, and then enter the version number or other information via the user interface of the proxy update system. A fallback for updating device software is to launch an existing application from the manufacturer, possibly again providing text instructions to the user to help them through the application's prompts. These fallbacks ensure that the present invention can be compatible with many existing (and future) devices not specifically intended to provide for automatic updating via a proxy system.

Figure 7:
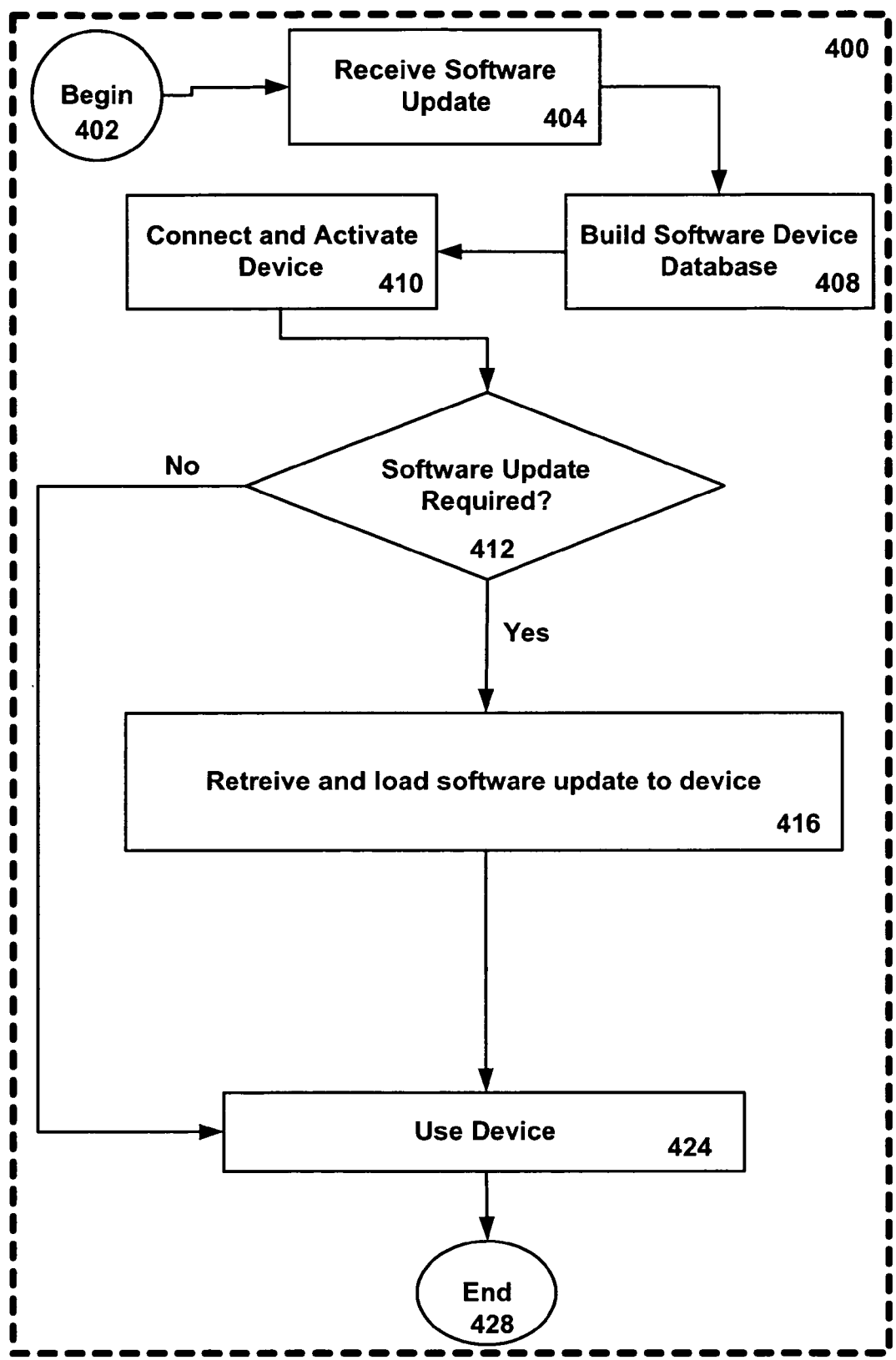
FIG. 7 is an alternate embodiment of a method for updating software in devices.

FIG. 7 is an alternate embodiment of a method for updating software in devices through active surveillance for software upgrade for devices intermittently connected to the coordinating computer 12. The alternate embodiment 400 includes the procedural routines engaged by the coordinating computer 12 to obtain software updates from originating or proxy software entities during the periods in which the devices are not connected to the coordinating computer 12. That is, alternate embodiment 400 is particularly suited for devices that are intermittingly connected, such as PDAs or cellular phones with PDA functions. At entry point 402 the coordinating computer 12 is in an active state and engages a Receive Software Update block 404. The Receive Update 404 communicates with primary (originating) or sub-tiered secondary software entities. The computer 12 then expands its device database in process block Build Software Device Database 408. Thereafter, at block 410, the device is connected and activated, the action of which is detected by the coordinating computer 12. At decision diamond 412 the coordinating computer 12 determines the answer to the query "Software Update Required". If the answer is No, the user operates the device with the currently embedded software version at block 424. If the answer is Yes, the process block Retrieve and Load Software 416 is engaged wherein the current software version is delivered to the device and becomes the embedded software to operate the device. The user then operates the device with the newly currently embedded software version at block 424. The alternate embodiment 400 is completed at terminus 428. The method of FIG. 7 imparts to a single device or multiple devices that intermittently communicate with the coordinating computer 12 to perform an update automatically shortly after the device is connected. The software employed in the method 400 on the proxy update system or coordinating computer 12 of the systems 10A and 10B preferably includes several sub-programs and performs several tasks, as described below. The software is configured to start when the overall system starts and remain running at all times, except for replacement and routine maintenance, for devices intermittingly connected to the coordinating computer 12.

Also residing in the method 400, like the method 200, is a software agent. Preferably, one of the agent's tasks is to populate a list of one or more devices for which the coordinating computer 12 acts as a proxy in searching for updates and performing update processes similar to the method 200. Referring again to FIG. 7, the list of devices generated by the method 400 is populated by any combination of manual entry by an end-user and by more automatic discovery, as described below. Similar to the method 200, the method 400 provides additional information about the device gathered automatically or via a user interface, such as serial number, user's device nickname for the device, utilization statistics, and device statistics, and is likewise conveyed by the coordinating computer 12 to the manufacturer or other central source for software version and device collation. Another particular embodiment of the software agent includes a function to determine when to check for device updates. This is done by a variety of triggers, for example when devices connect, when a predetermined period has elapsed since the last check or last device connection, and/or when a new list of available software is provided from primary and secondary software entities.

Another function of the software agent residing in the method 400 is to download available software updates to store locally on the proxy update system 12. Given the list of devices that have connected to the proxy system and the current version of software on those specific devices in the Software Database block 408, it is possible to determine that newer software is available for some devices, download it from the indicated source, and store it locally in anticipation of future updates of the device. In this case the agent would annotate the database of block 408 to indicate that updated software is already downloaded and include a location on the local system of the cached copy. In one embodiment the download function delays the download, for example to perform it during periods of low bandwidth utilization, or to notify an end user and await confirmation. The download function includes one-way or two-way authentication or employs the use of digital signatures to ensure that the source of the software update is authentic and/or that the user of the device and/or the proxy system is allowed access to the software updates. It further includes billing capabilities wherein the user is charged for the updated software, by subscription or by specific software element, which can be performed with the assistance of stored data about user preferences and payment means or alternatively with the intervention of user interface.

Figure 8:
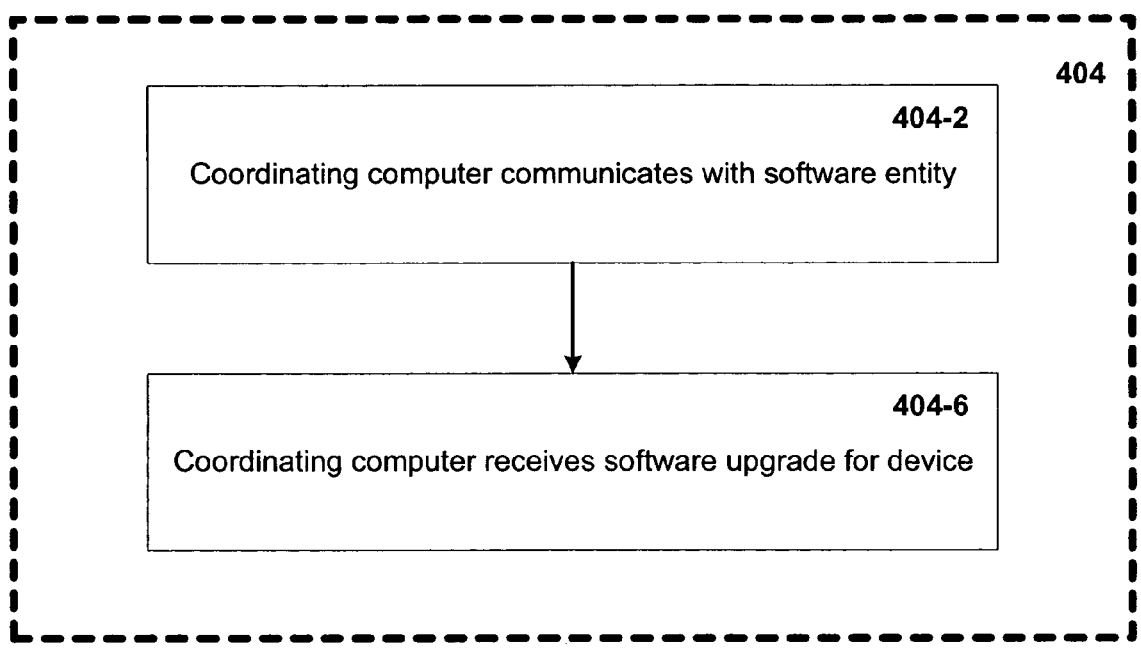
FIG. 8 is an expansion of the Receive Software Update block of FIG. 7.

FIG. 8 is an expansion of the Receive Software Update block of FIG. 7 and describes more alternate or optional capabilities of the software agent functioning. The Receive Software update block 404 begins with a Coordinating Computer Communicates block 404-2. In block 404-2 the coordinating computer 12 communicates with primary (originating) software entities or secondary (sub-tiered) software entities to obtain software update versions. The communication may be initiated by the coordinating computer 12 with the software entities, or initiated by the software entities with the coordinating computer 12 or by other means. Upon communication, the coordinating computer 12, at block 404-6, receives software upgrade for the device. The software agent function may look up and interpret instructions specific to the type of device in order to query it for current firmware version or other software contents. For example, by enumerating file contents of specific directories or areas of the device storage, opening a specific address or port and sending a query instruction, retrieving a response from a URL the device supports, or other means. The agent may alternatively launch an associated sub-program which contains device-specific capability for determining software contents, or display instructions to an end-user via the proxy update system user interface and ask the user to interact with the device or examine its labeling, and provide software or version information to the agent.

Figure 9:
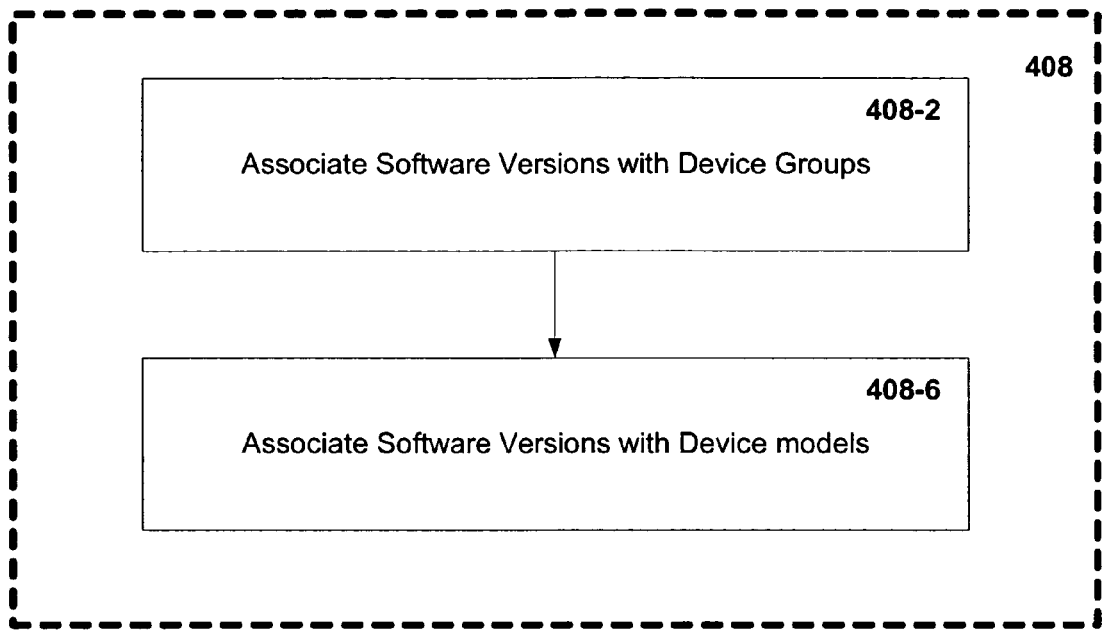
FIG. 9 is an expansion of the Build software Device Database block of FIG. 7.

FIG. 9 is an expansion of the Build Software Device Database block of FIG. 7. The Build Software Device Database block 408 begins with Associate Software Versions block 408-2 where incoming software versions are associated or categorized with device groups. For example, software is sorted by PDA devices, printers, cell phones, and other digital devices. Thereafter, at Associate with Device Models block 408-6, the incoming software in the database is further associated by manufacturer and model number of a particular device. Block 408 maintains the database of available device software as a list of the most current version numbers of available firmware or software for a variety of devices and a source for obtaining each piece of device software, such as an Internet URL (FTP or HTTP address) to the manufacturer's website. (In some embodiments, additional information can be stored about some or all, or preferably each piece of software, such as its criticality, cost, dependency on other software updates, and textual description.) This database is itself typically updateable, for example via Internet download, and it is desirable that it be periodically updated by the software agent itself. In another particular embodiment, a relational database is used to allow interrelated storage of lists of known device types, available software components associated with each device type, known versions of these components, specific instances of devices which are or have been attached to the proxy update system 12, and actual software components and versions found on these attached devices. A desirable addition to the Build Database block 408 is to store for each device and/or each piece of device software the means by which software is updated on the device. Examples of these means include a series of "escape" codes, transmission of a file to a known location or port or address on the device using HTTP, FTP, or other protocols, as part of an initialization sequence normally performed by software on the proxy update system, end-user instructions such as depressing certain controls on the device, or running a specific application on the proxy update system designed to perform the software update. The database may store a description of the means of updating to be displayed as instructions to the end user, or the location (local or Internet address) of a software application to run to perform the updates, or a series of instructions that the agent can interpret and execute itself. The database may also store authentication information, i.e. an update username and/or password that the device will require when updates are performed or a digital signature key used to verify identity when communicating with the device.

Figure 10:
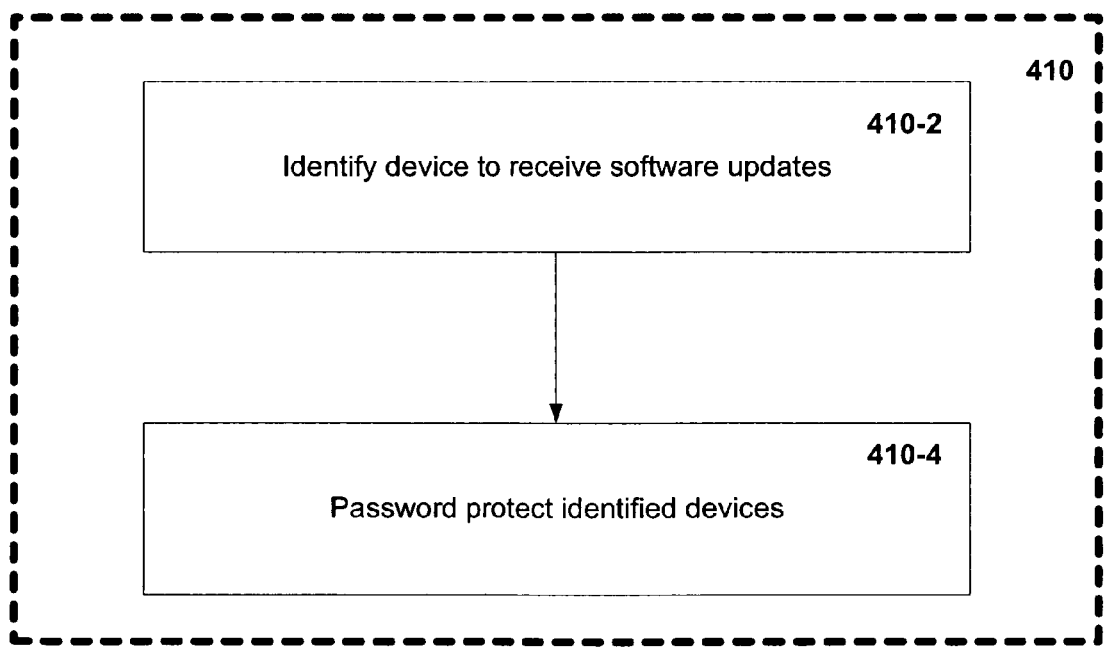
FIG. 10 is an expansion of the Connect and Activate Device block of FIG. 7.

FIG. 10 is an expansion of the Connect and Activate Device block of FIG. 7. The Connect and Activate Device block 410 block begins with the identify devices to receive software updates block 410-2 in which the coordinating computer 12 decides what device is currently connected and activated and what software updates are available for the device. Thereafter, at block 410-4, a password protection process is engaged as part of the security measure for preparing the software upgrade.

Figure 11:
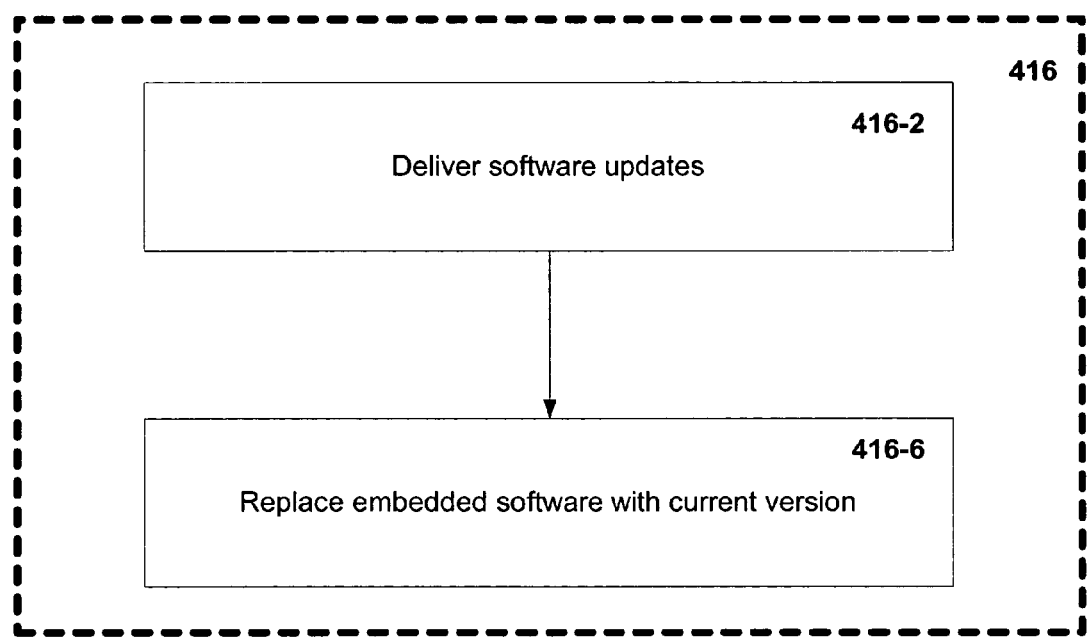
FIG. 11 is an expansion of the Retrieve and Load Software block of FIG. 7.

FIG. 11 is an expansion of the Retrieve and Load Software block of FIG. 7. After the computer 12 determines that a software update is required at decision diamond 412, at process block 416, current version software is retrieved from the Database 408 and loaded into the recently connected device, replacing the prior embedded version. The Retrieve and Load Software block 416 block begins with the Deliver software updates block 416-2 in which the coordinating computer 12 downloads or delivers to the currently connected device the currently available software upgrade. Thereafter, at block 410-6, the embedded software version of the just connected device is replaced with the currently available software upgrade.

Figure 12:
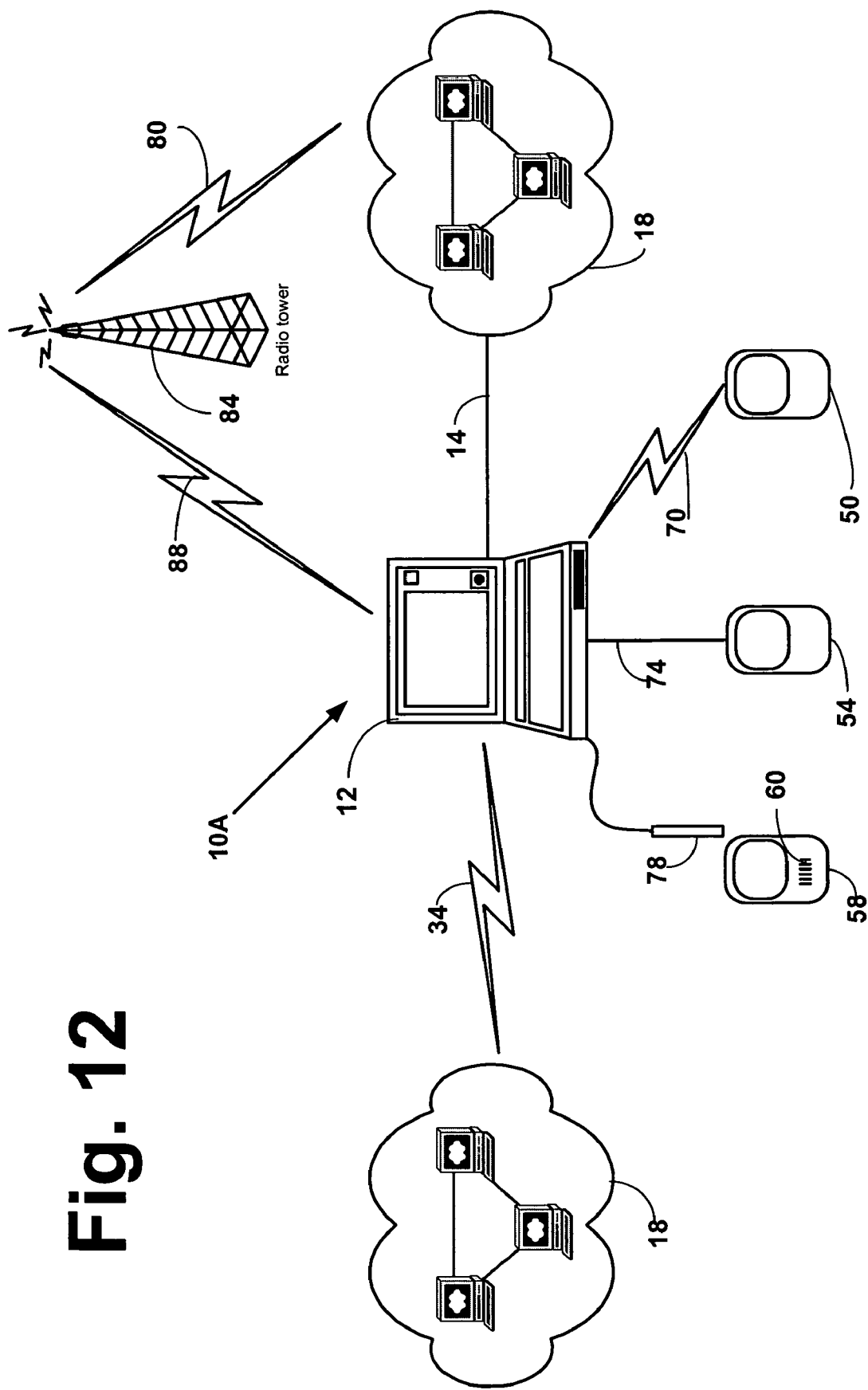
FIG. 12 is an alternate embodiment of a software updating system.

A particular embodiment illustrated in FIG. 2 includes a database server 23 that is separate from the coordinating computer 12. This is in partial contrast to another embodiment in FIG. 12 which demonstrates a system that does not require a database server, and is sufficiently enabled through inclusion of a proxy update system and one or more devices to be updated.

In this embodiment many of the method functions described in methods 200 and 400 are relocated to a database server 23. The server 23 communicates with the coordinating computer 12 via a connection interface, such as the Internet 18. Because the set of devices that can be updated may be large and availability of newer device software may be a frequent event, separation of the database 24 from the coordinating computer eliminates the problem of distributing a frequently changing database to each proxy update system that employs the present invention. Instead, one or more proxy update systems can communicate with a database server that is typically more powerful or more continuously connected or connected at higher bandwidth than the coordinating computer and that maintains more frequent data about software updates. The functions transferred to the database server 23 maintain a database 24 of device software versions available, and in one embodiment further contain locations or addresses for obtaining said software (similar to the database described in methods 200 and 400). The database server 23 preferably includes a means of communication with the proxy update system, in one embodiment accepting and responding to database queries from the proxy update system. The proxy update system will query specifying a given device type and obtain a list of all available software or all most-recent versions of available software supported on that device. Alternatively it queries about a specific device software application and receive a response describing the most current version of that application. Another variation provides a specific device software application and version and receives a binary response indicating whether that is the most current version, or if it is not, then information about the location of any newer versions. Alternatively the coordinating PC simply identifies itself uniquely to the database server, which is sufficient, when used in combination with information such as device data from the PC that is replicated on the database server, to allow the database server to respond with a list of all software updates of interest to the proxy update server for all devices that it proxies. Any of these query types can be individually sufficient, and all can be implemented using any database query technique, such as common gateway interface ("CGI") scripts or equivalents, or standard query language ("SQL") or extensible markup language query languages such as "XML-QL" and XQuery.

A particular embodiment of the database server 23 includes the ability to "crawl" known locations, such as the Internet web sites of device manufacturers. The crawler, sometimes with the additional input of information about the structure of these websites, preferably automatically determines a list of device types or models, notes what device software versions are available and records the locations where they can be obtained, using this information to update the device software version database. Further preferable capability of the database server 23 includes the ability to create a record such as a database of one or more proxy update servers, and associated user names and account details. This capability enhances the ability of a single database server to participate as a component of an update system with more than one proxy update server.

In yet another particular embodiment, a copy of the information about devices encountered locally by that proxy system is maintained by the database server 23. This function provides multiple benefits. It facilitates the database server response to a proxy update system identifying device software updates of interest to that proxy system, merely by receiving an identifier for the proxy system, thus minimizing the network bandwidth required for this frequent exchange. It also permits that if a proxy update server is replaced, a replacement can quickly be configured retrieving information from the database server, without the need to re-create local device databases or other information. It further allows the database server to record and aggregate potentially valuable information about devices found connected to or in communication with a large population of proxy update systems. The data from the database server is available for sale or for license to manufacture and software vendors or other entities for service and support or marketing or research or other purposes.

In one embodiment this capability is enabled by equipping the proxy update server to perform notifications to the database server, and the database server to process such notifications, to keep the two copies of the proxy update system device database synchronized. The database technologies mentioned in methods 200 and 400 are among possible means to perform such synchronization. Use of widely available database replication technology is another means of enabling the synchronization of data between the database server and the proxy update system.

A further preferable capability of the database server 23 embodiment is to provide outgoing notifications to proxy update systems of some new software versions based on criteria such as criticality, type of update (e.g. service release versus new features), or user preferences. When the database is changed to include new versions in response to administrator manual input, new results from the crawler, or other means, it determines a set of proxy update servers that attach to or communicate with devices capable of running new software versions. Moreover, notification via datagram messages, email, instant message, short message service SMS (the means by which cellular phones exchange short text messages), and other messaging mechanisms, or combinations thereof, are preferably enabled. This ensures that updates pass through all components of the system and reach the devices extremely rapidly even if the polling interval between checks initiated by the proxy system for updates is long, which is especially useful for updates deemed critical.

An embodiment capability of the database 23 for systems 10A or 10B is the introduction of one or more additional layers of proxy systems between the database server (which describes a known universe of all devices and all software) and the proxy update server (which describes a smaller universe of one system and its associated devices). For example, in a corporate environment consisting of thousands of computer systems each connected to a multitude of devices, many computer systems act as proxy systems for one or more devices. In a preferred embodiment a corporate-level proxy interacts with and combines information from the proxy update systems to record a specified universe of all devices used within the enterprise and software used on those devices, and all software available for those devices. This enables so-called asset management by inventorying the population of devices and enables software license compliance including calculation of appropriate payment. It further promotes efficient use of network bandwidth by ensuring that even if many instances of the same device are used in the enterprise, a software update for that type of device may be downloaded from an outside source to the enterprise only once and then redistributed to each proxy system. To enable this capability one embodiment of the intermediate server includes some of the capabilities of the proxy update server and some of the capabilities of the database server.

Other advantages conferred by the database server 23 include ancillary user interface and capabilities, such as the ability to manage user subscriptions, update the database of devices and known software, and perform billing and accounting functions. It further allows users to examine the inventory of their devices and status or history of updates even at times when the user does not have the ability to interface with a proxy update system. It additionally allows the viewing of aggregated or individual information useful to software vendors or device manufacturers or other third parties.

The systems outlined above include many varying components and capabilities. This helps to ensure that one or more of the embodiments are applicable to many devices that already exist or do not yet exist, and/or devices that do not implement any or all new enabling technologies, but also allows additional benefits such as automation, ease-of-use, or security for devices which do incorporate such innovations.

While the preferred embodiments of the invention have been illustrated and described, as noted above, many changes can be made without departing from the spirit and scope of the invention. The method 400 can be similarly employed, as the case for the method 200 in the systems 10A and 10B, to provide for a fallback option for determining current software contents and versions in order to be backward compatible with other systems. In one example, a display of text instructions is provided to the user, and the user is prompted or otherwise queried to examine the device, and then enter the version number or other information via the user interface of the proxy update system. One fallback method for updating device software is to launch an existing application from the manufacturer, again providing text instructions to the user to help them through the application's prompts. These fallback methods enable the present invention to be compatible with many existing (and future) devices not specifically intended to provide for automatic updating via a proxy system.

Another embodiment provides for the case when users do not want to inventory their devices but instead prefer to relegate these efforts to a subscription service that provides the inventory and software updating functions. In one embodiment, the software-updating agent is provided as a subscription based service. For example, some users do not want to take the time to even inventory all their devices. Instead, they subscribe to a service that keeps all their devices up to date. The users simply register for the service, and use all their devices as usual, and the service will do the rest. The system will detect the devices, and keep an inventory. Additionally, it will constantly monitor software updates, either by crawling, and/or by previous arrangement with manufacturers. Because the service can be open to any and all manufacturers and any and all users, the service gives rise to a new business and business model that has not before existed. With this embodiment, users need not complete a warranty card or think about their devices anymore; they just use them. Similarly, subscribing manufacturers can provide superior product support and customer service knowing that all devices can be easily kept current automatically, without hassle to their customers. A third party employing the present method and system could sell or license a service to manufacturers or third-party vendors which reduces cost of supporting their products or collects additional revenue from customers.

The system as described above is preferably optimized for updating software. Alternate embodiments of the present methods and systems for communication between a device and a coordinating computer (or device or devices) or proxy system and one or more network servers for other purposes, and do not necessarily require enabling of software updating. Such other purposes include collection of device data, such as one or more or any combination of the following: serial numbers, demographic and usage data, statistics from the device, troubleshooting data, error reports, up-time data, inventory of devices and contents, details of purchase such as date, cost, and source, and dates of installation or use of devices.

These and similar data are collected with minimal delay by the system and can be used to enable one or more or any combination of the following and other actions: software updates, timely product support, warranty administration, inventory or insurance or depreciation of devices, market research, sales and promotion of device upgrades or replacements or of additional devices or device software or services or device accessories, design research for improvement of reliability or functionality or compatibility or ease of use of current and future devices, and competitive analysis.

Accordingly, the scope of the invention is not limited by the disclosure of the particular embodiments.

The invention claimed is:

1. A system to provide current operable software to a plurality of microprocessor-based digital devices, each current operable software associated with a corresponding microprocessor-based digital device and storable within the memory storage of the corresponding microprocessor-based digital device, the system comprising:
   one or more software update sources having current operable software;
   a user-controlled coordinating computer having memory storage in signal communication with the one or more software update sources, wherein the coordinating computer is separate from the plurality of microprocessor-based digital devices;
   a software agent installable into the coordinating computer and operably configured to:
      for at least some of the current operable software associated with the plurality of microprocessor-based digital devices, provide active surveillance for, or receive notification of availability of, and retrieve from the one or more software update sources an updated software version of a corresponding current operable software during time periods including at least a period when at least one of the microprocessor-based digital devices is not in communication with the coordinating computer;
      store the updated software versions in the memory storage of the coordinating computer; and
      for each of at least some of the stored updated software versions,
         retrieve from the coordinating computer memory storage the updated software version;
         determine transmission information for the microprocessor-based digital device associated with the current operable software corresponding to the retrieved updated software version, the transmission information specifying a device-specific mechanism including at least an indication of content and instructions, to be used to update the corresponding microprocessor-based digital device, wherein the device-specific mechanisms for updating at least two of the microprocessor-based digital devices are different based at least in part on different types of device hardware and/or software; and
         using the device-specific mechanism specified by the determined transmission information, transfer the retrieved updated software version to the corresponding microprocessor-based digital device upon communication of the corresponding microprocessor-based digital device with the coordinating computer.

2. The system of claim 1 wherein the software update sources include at least one of a data store, a data source of a primary software entity, and/or a data source of a secondary software entity.

3. The system of claim 2 wherein the coordinating computer is in signal communication with the primary software entity via a network or the Internet.

4. The system of claim 3 wherein the primary software entity comprises the manufacturer of at least one of the microprocessor-based devices.

5. The system of claim 2 wherein the secondary software entity comprises at least one website address identifying at least one device software database.

6. The system of claim 1 wherein the coordinating computer is configured to accept requests for device information concerning the microprocessor-based digital devices utilizing at least one of hypertext transfer protocol or file transfer protocol.

7. The system of claim 6 wherein the device information includes at least one of device group, manufacturer, manufacturer model, current firmware version, file content directories, device storage locations, available address ports, device-specific capability, relational database, device type, manner of querying device type, available software components associated with device types, and/or a set of instructions to display to query a user via a user interface of the coordinating computer.

8. The system of claim 7 wherein the set of instructions include prompts for presentation on the user interface to provide a fallback option to permit backward compatibility for some of the microprocessor-based digital devices.

9. The system of claim 8 wherein the prompts query the user to interact with at least one of the microprocessor-based digital devices to provide software version information to the software agent.

10. The system of claim 1 wherein the indicated instructions of a device-specific mechanism specified by transmission information comprises one or more of a series of escape codes, a device initialization sequence, instructions for causing a set of controls on a device to be depressed, and/or causing running a device specific update application on the coordinating computer.

11. A method to provide current operable software to a plurality of microprocessor-based digital devices, each current operable software associated with a corresponding microprocessor-based digital device and storable within the memory storage of the corresponding microprocessor-based digital device, the method comprising:
   connecting a user-controlled coordinating computer having memory storage to one or more software update sources having currently operable software, wherein the coordinating computer is separate from the plurality of microprocessor-based digital devices and wherein the coordinating computer has installed thereon a software agent configured to cause the coordinating computer to act as a proxy for receiving updates for and providing updates to the plurality of microprocessor-based digital device;
   for at least some of the current operable software associated with the plurality of microprocessor-based digital devices, providing active surveillance for, or receiving notification of availability of, and retrieving from the one or more software update sources an updated software version of a corresponding current operable software during time periods including at least a period when at least one of the microprocessor-based digital devices is not in communication with the coordinating computer;
   storing the updated software versions in the memory storage of the coordinating computer; and for each of at least some of the stored updated software versions,
  retrieving from the coordinating computer memory storage the updated software version;
  determining transmission information for the microprocessor-based digital device associated with the current operable software corresponding to the retrieved updated software version, the transmission information specifying a device-specific mechanism including at least an indication of content and instructions, to be used to update the corresponding microprocessor-based digital device, wherein the device-specific mechanisms for updating at least two of the microprocessor-based digital devices are different based at least in part on different types of device hardware and/or software; and
  using the device-specific mechanism specified by the determined transmission information, transferring the retrieved updated software version to the corresponding microprocessor-based digital device upon communication of the corresponding microprocessor-based digital device with the coordinating computer.

12. The method of claim 11 wherein connecting the coordinating computer to the one or more software update sources include connecting the coordinating computer to at least one of a data store, a primary software entity, and/or a secondary software entity.

13. The method of claim 12 wherein connecting the coordinating computer includes connecting the coordinating computer to the primary software entity via a network or the Internet.

14. The method of claim 13 wherein connecting to the primary software entity via the network is via communication with a manufacturer of at least one of the microprocessor-based digital devices.

15. The method of claim 12 wherein connecting the coordinating computer includes connecting the coordinating computer to the secondary software entity via at least one website address identifying at least one device software database.

16. The method of claim 11 wherein connecting the coordinating computer to the one or more software update sources includes connecting via the Internet.

17. The method of claim 11 the method further comprising accepting requests for device information concerning the microprocessor-based digital devices utilizing at least one of hypertext transfer protocol and/or file transfer protocol.

18. The method of claim 17 wherein the device information includes at least one of device group, manufacturer, manufacturer model, current firmware version, file content directories, device storage locations, available address ports, device-specific capability, relational database, device type, manner of querying device type, available software components associated with device types, and/or a set of instructions to display to query a user via a user interface of the coordinating computer.

19. The method of claim 18 wherein accepting requests for device information includes the set of instructions to display and the set of instructions further comprises prompts presentable on the user interface of the coordinating computer to provide a fallback option to permit backward compatibility for some of the microprocessor-based digital devices.

20. The method of claim 19 wherein the prompts are presentable to query the user to interact with at least one of the microprocessor-based digital devices to provide software version information to the software agent.

21. The method of claim 11 wherein the indicated instructions of a device-specific mechanism specified by transmission information comprises one or more of a series of escape codes, a device initialization sequence, instructions for causing a set of controls on a device to be depressed, and/or causing running a device specific update application on the coordinating computer.

22. A computer-readable memory medium comprising instructions configured as a software agent for controlling a computer processor in a user-controlled coordinating computer to automatically provide software updates to a plurality of microprocessor-based digital devices separate from the coordinating computer, by performing a method comprising:
  receiving indications from or discovering information from the intermittent presence of each of the plurality of microprocessor-based digital devices that can receive automatic updates to current operable software resident in the memory of each of the plurality of microprocessor-based digital devices;
  registering the devices that can receive the automatic updates;
  connecting the user-controlled coordinating computer to a plurality of software update sources for receiving updates to the current operable software of the registered plurality of microprocessor-based digital devices;
  while at least some of the registered devices are not connected to the coordinating computer, searching for, or receiving notification of availability of, and retrieving from the software update sources updated versions of at least some of the software corresponding to current operable software of the registered devices;
  storing the updated versions of the current operable software in the memory of the coordinating computer; and
  for those devices of the plurality of registered devices for which updated versions of current operable software are determined to be available,
    retrieving the stored updated version of current operable software for the device;
    determining transmission information for the device associated with the current operable software corresponding to the retrieved updated software version, the transmission information specifying a device-specific mechanism including at least an indication of content and instructions, to be used to update the corresponding device, wherein the device-specific mechanisms for updating at least two of the microprocessor-based digital devices are different to accommodate different types of device hardware and/or software; and
    using the device-specific mechanism specified by the determined transmission information, transferring the retrieved updated software version to the corresponding device upon communication of the corresponding device with the coordinating computer.

23. The memory medium of claim 22 wherein the indicated instructions of a device-specific mechanism specified by transmission information comprises one or more of a series of escape codes, a device initialization sequence, instructions for causing a set of controls on a device to be depressed, and/or causing running a device specific update application on the coordinating computer.

\* \* \* \* \*